United States Patent
Cho

(10) Patent No.: US 7,404,467 B2
(45) Date of Patent: Jul. 29, 2008

(54) DEVICE FOR TRANSFERRING TWO-WHEEL MOTORBIKE INTO THREE-WHEEL VEHICLE

(75) Inventor: Jih-Kuei Cho, Guanyin Township (TW)

(73) Assignee: Shine Far Metal Industry Co., Ltd., Guanyin Township (TW)

( * ) Notice: Subject to any disclaimer, the term of this patent is extended or adjusted under 35 U.S.C. 154(b) by 440 days.

(21) Appl. No.: 11/163,787

(22) Filed: Oct. 31, 2005

(65) Prior Publication Data

US 2007/0095590 A1    May 3, 2007

(51) Int. Cl.
  *B62K 13/00*    (2006.01)
  *B62K 13/08*    (2006.01)

(52) U.S. Cl. ........................ 180/209; 180/210

(58) Field of Classification Search ............... 180/209, 180/215, 210, 312, 219; 280/274, 281.1
See application file for complete search history.

(56) References Cited

U.S. PATENT DOCUMENTS

| | | | | |
|---|---|---|---|---|
| 1,933,102 A | * | 10/1933 | Du Pont et al. | 180/210 |
| 1,956,319 A | * | 4/1934 | Du Pont et al. | 180/16 |
| 2,819,093 A | * | 1/1958 | Geiser | 280/282 |
| 4,287,960 A | * | 9/1981 | McConnell | 180/16 |
| 4,630,699 A | * | 12/1986 | Yamada et al. | 180/375 |

* cited by examiner

*Primary Examiner*—Eric Culbreth
*Assistant Examiner*—Nicole Verley
(74) *Attorney, Agent, or Firm*—C. G. Mersereau; Nokolai & Mersereau, P.A.

(57) ABSTRACT

A device for transferring two-wheel motorbike into three-wheel vehicle includes a rectangle frame directly connected to the frame of the two-wheel motorbike and two side frames are connected to two ends of the rectangle frame. Two wing rods ARE connected to the two side frames respectively and an arm is pivotably connected to each of the side rods. A cushion means is connected between the side frame and the arm. A differential frame is connected between the two side frames so as to be connected with a differential which has an input end connected to an output shaft of an engine, and an output end of the differential is connected to two transmitting shafts which are connected to two rear wheels. The rear wheels each have a brake mechanism.

8 Claims, 6 Drawing Sheets

DEVICE FOR TRANSFERRING TWO-WHEEL MOTORBIKE INTO THREE-WHEEL VEHICLE

FIELD OF THE INVENTION

The present invention relates to a device for conveniently transferring two-wheel motorbike into three-wheel vehicle.

BACKGROUND OF THE INVENTION

A conventional two-wheel motorbike generally includes a frame with an engine, a gear box connected with the engine, two wheels connected to two ends of the frame, a handlebar and an outer casing. The engine is fixed to the frame and the output power of the engine is transferred to the real wheel by a chain. The handlebar is able to change the direction of the front wheel. A three-wheel vehicle includes a differential and two transmitting shafts connected with two rear wheels. Obviously, the two-wheel motorbike cannot directly transfer to three-wheel vehicle by the existed frame of the two-wheel motorbike. Therefore, there is no way to use the structure of the two-wheel motorbike to be transferred into a three-wheel vehicle. The user has to order a new three-wheel vehicle and all of the parts of the two-wheel motorbike become useless.

The present invention intends to provide a device that can be directly connected to the frame of the two-wheel motorbike and the engine and a differential are connected to the device, and two transmitting shafts are connected to two rear wheels such that the most of the parts of the two-wheel motorbike can be used for the three-wheel vehicle.

SUMMARY OF THE INVENTION

The present invention relates to a device for transferring two-wheel motorbike into three-wheel vehicle, and comprises a rectangle frame fixed on a frame of the two-wheel motorbike and each end of the rectangle frame has two threaded rods extending therefrom. Two side frames are connected to two ends of the rectangle frame by extending the threaded rods through holes the two side frames and connected with nuts. Two wing rods are connected to the two side frames respectively and each wing rod has a pivot of an arm pivotably connected thereto. A cushion means is connected between the side frame and the arm. A differential frame is connected between the two side frames and has an adjustment member at a mediate portion of a tube thereof such that a top end of a hanging rod is connected to the two adjustment members. The hanging rod has a retractable means to adjust the length thereof and an end of the hanging rod is pivotably connected to a lug of a differential. The differential has an input end connected to an output shaft of an engine and an output end of the differential is connected to two transmitting shafts which extend through bears on the arms and are connected to two rear wheels. The rear wheels each have a brake mechanism.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
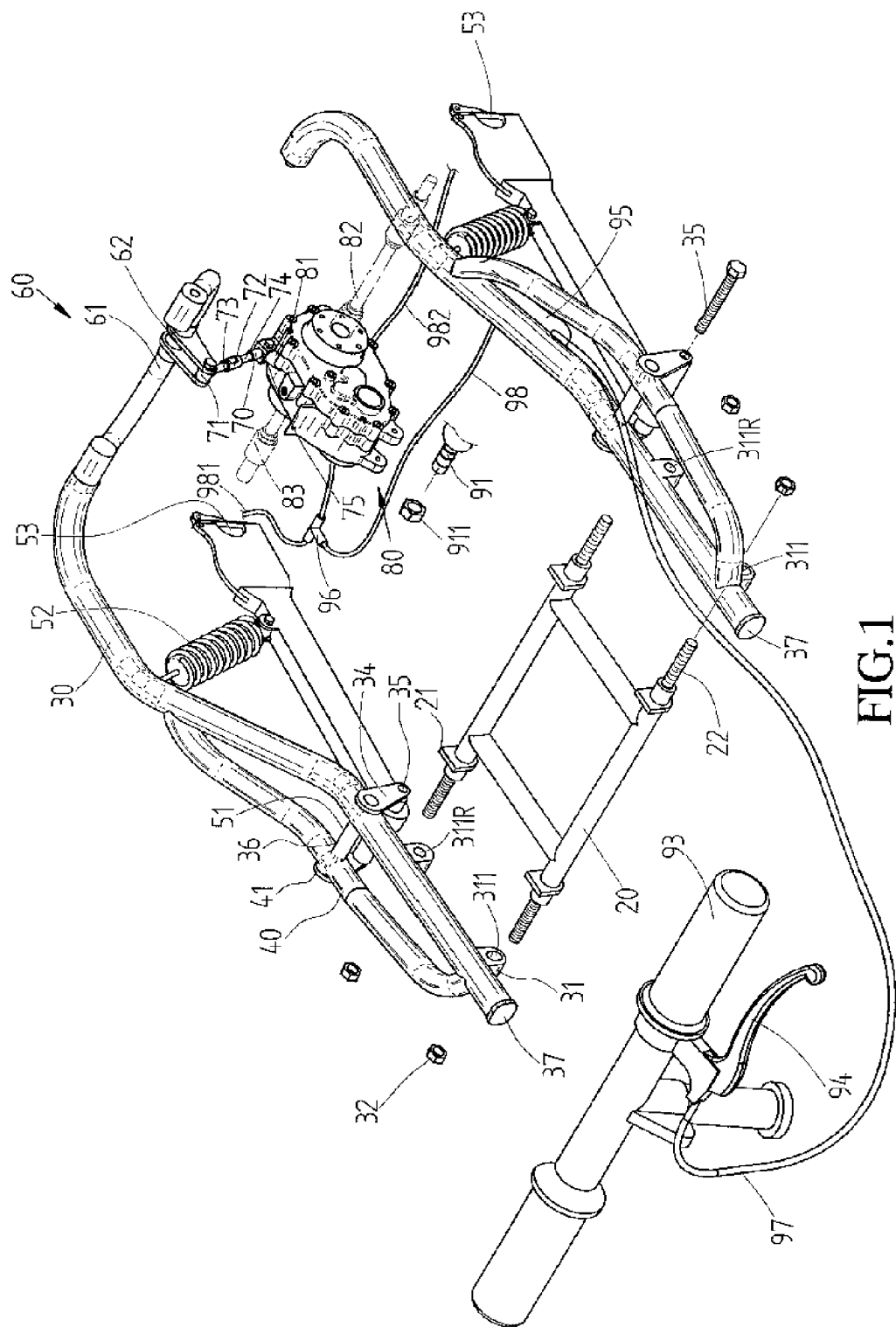
FIG. 1 is an exploded view to show the device of the present invention.
Figure 2:
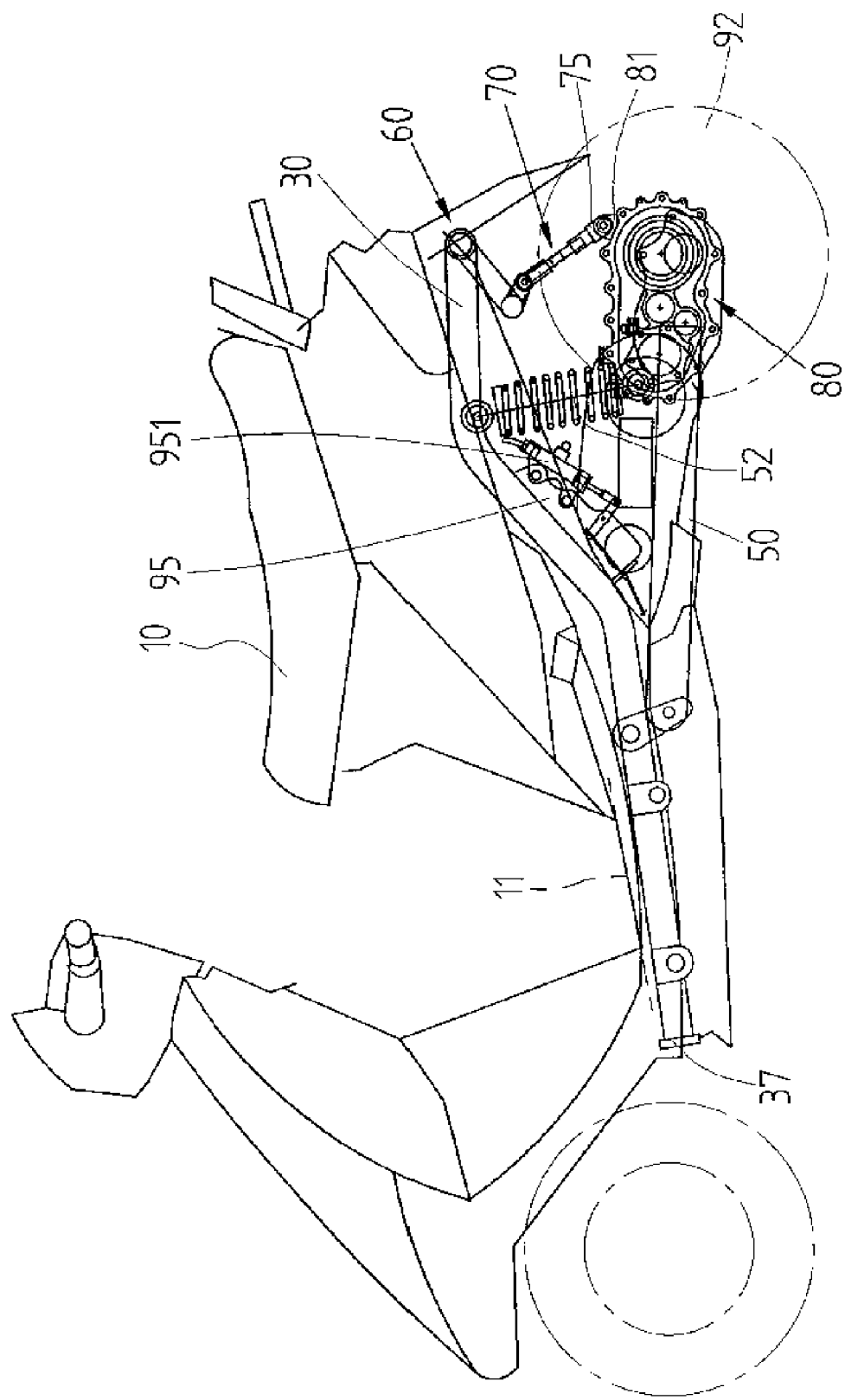
FIG. 2 is a side view to show the three-wheel vehicle of the present invention.
Figure 3:
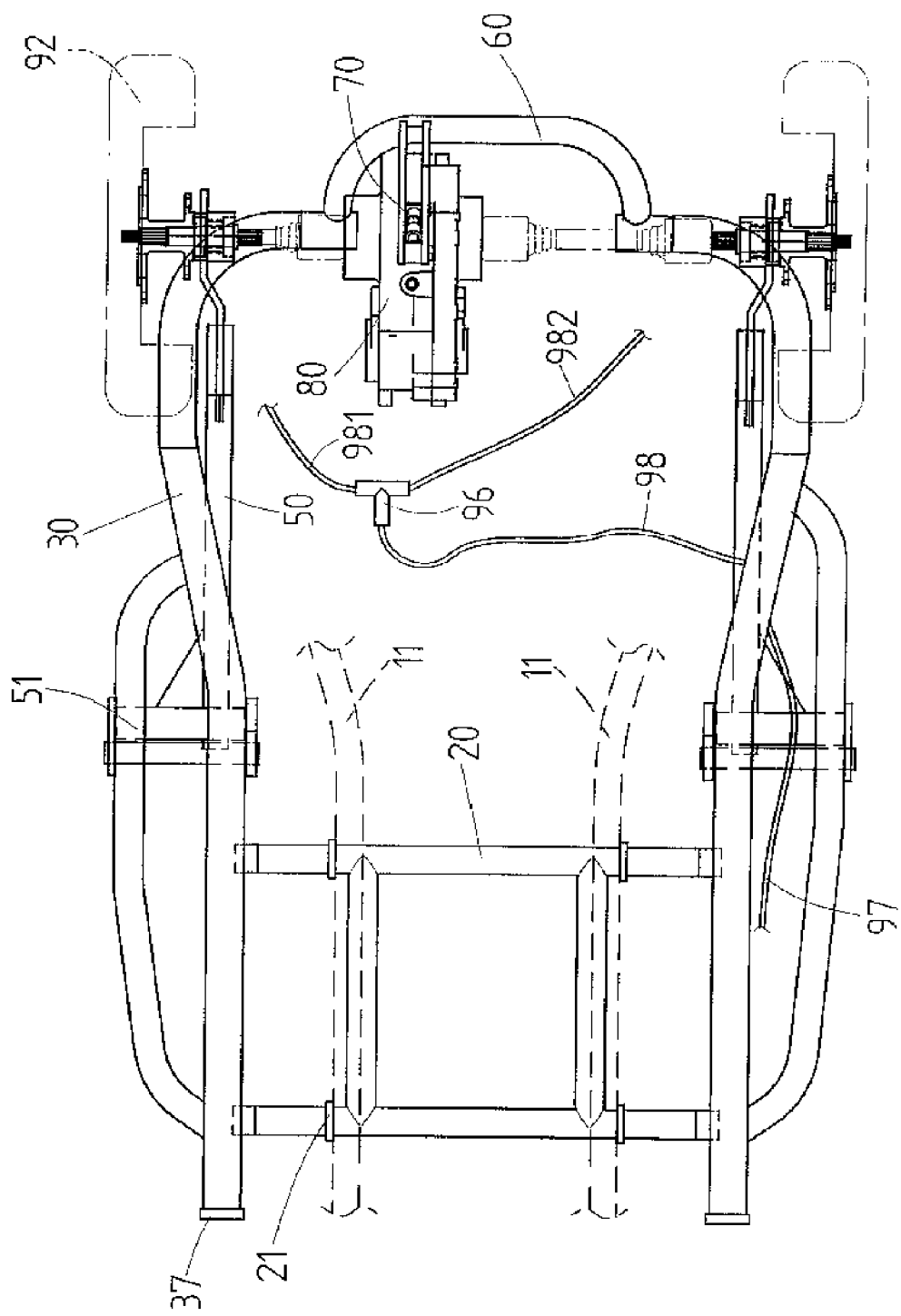
FIG. 3 is a top view to show the device of the present invention.

Referring to FIGS. 1 to 3, the device for transferring a two-wheel motorbike into s three-wheel vehicle of the present invention comprises a rectangle frame 20 which is directly connected to the frame 11 of the two-wheel motorbike 10 and has four fixing plates 21 on four corners thereof so that the fixing plates 21 are fixed to the frame 11 of the two-wheel motorbike 10. Each end of the rectangle frame 20 has two threaded rods 22 extending therefrom.

Two side frames 30 are connected to two ends of the rectangle frame 20 by extending the threaded rods 22 through an elongate hole 311 and a circular hole 311R in lugs 31 on the two side frames 20, nuts 32 are connected to the threaded rods 22 to fix the threaded rods 22. Two wing rods 40 are connected to the two side frames 30 respectively and each side frame 30 has an extension plate 34 and each wing rod 40 has another extension plate 41 so that a bolt 35 extends through the extension plates 34, 41 and a pivot 51 of an arm 50 is pivotably connected to each of the side rods 40. A cushion means 52 is connected between the side frame 30 and the arm 50, and a transverse bar 36 is connected between each of the side frames 30 and the wing rods 40. A differential frame 60 is connected between the two side frames 30 and has an adjustment member 62 at a mediate portion of a tube 61 thereof such that a top end 71 of a hanging rod 70 is connected to the two adjustment members 62. The tubes 61 of the differential frame 60 are adjusted to desired positions and fixed to the side frames 30. The adjustment member 62 tubes 61 of the differential frame 60 are pivoted to desired positions and fixed to the tube 61 of the differential frame 60.

The hanging rod 70 has a retractable means to adjust the length thereof and the retractable means includes an adjustment nut 72 which includes two threaded sections in opposite directions and two threaded rods 73, 74 are threadedly connected to the threaded sections of the adjustment nut 72 so that when rotating the adjustment nut 72, the threaded rods 73, 74 are moved in opposite directions to adjust the length of the hanging rod 70. An end of the hanging rod 70 is pivotably connected to a lug 81 of a differential 80. The differential 80 has an input end connected to an output shaft 91 of an engine and an output end of the differential 80 is connected to two transmitting shafts 82, 83 which extend through bears 53 on the arms 50 and are connected to two rear wheels 92. The output shaft 91 of the engine includes grooves and is connected with a nut 911 after the output shaft 91 is connected with the differential 80. The rear wheels 92 each have a brake mechanism. The two transmitting shafts 82, 83 of the differential 80 have different lengths.

Figure 5:
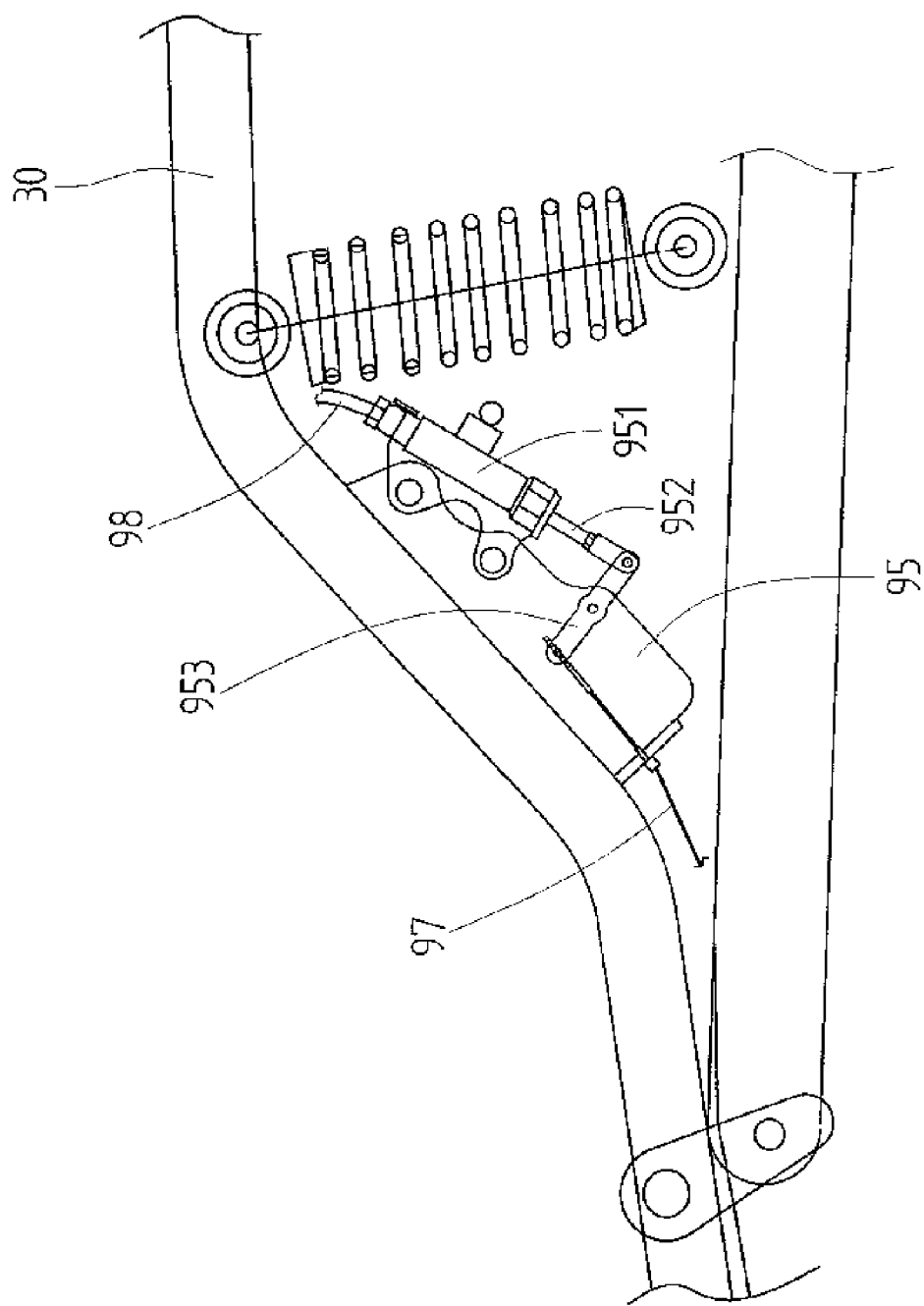
FIG. 5 shows the brake mechanism of the three-wheel vehicle.
Figure 6:
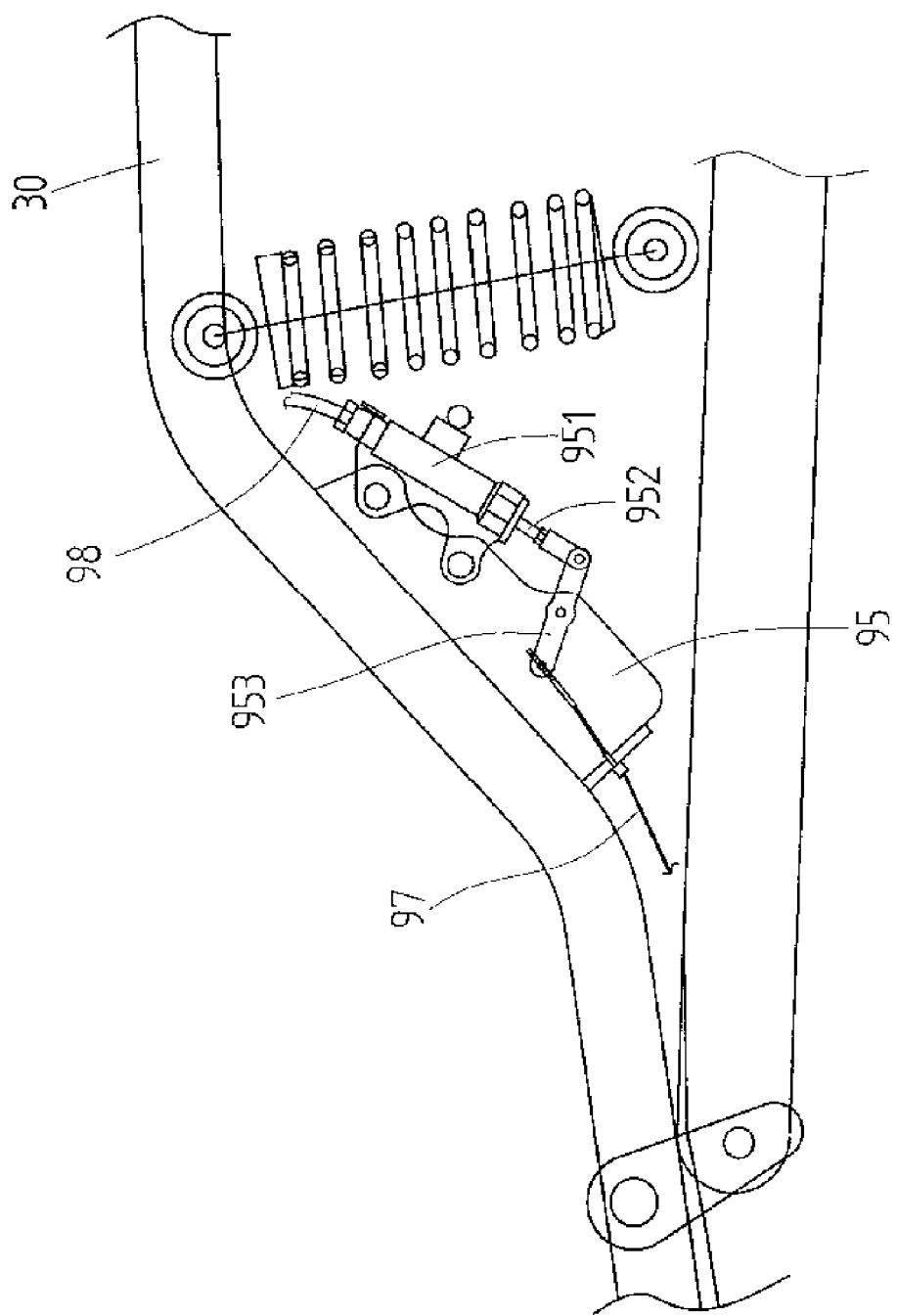
FIG. 6 shows that the brake mechanism is activated.

Further referring to FIGS. 5 and 6, the brake mechanism on each of the rear wheels 92 includes a brake disk and a brake pump is fixed on the arm 50. A handlebar 93 has a brake lever 94 and a brake cable 97 is connected to the brake lever 94. The brake cable 97 is connected to a first end of a bar 953 on a main pump frame 95 and the other end of the bar 953 is pivotably connected to an action member 952 on the main pump 951 which is fixed on the main pump frame 95. The main pump 951 has a hose 98 which is connected to a valve 96 which is connected to two sub-hoses 981, 982 which are connected to two respective brake pumps. When the brake lever 94 is pulled to pull the brake cable 97, the bar 953 is activated to drive the action member 952 to send hydraulic oil to the brake pumps.

Figure 4:
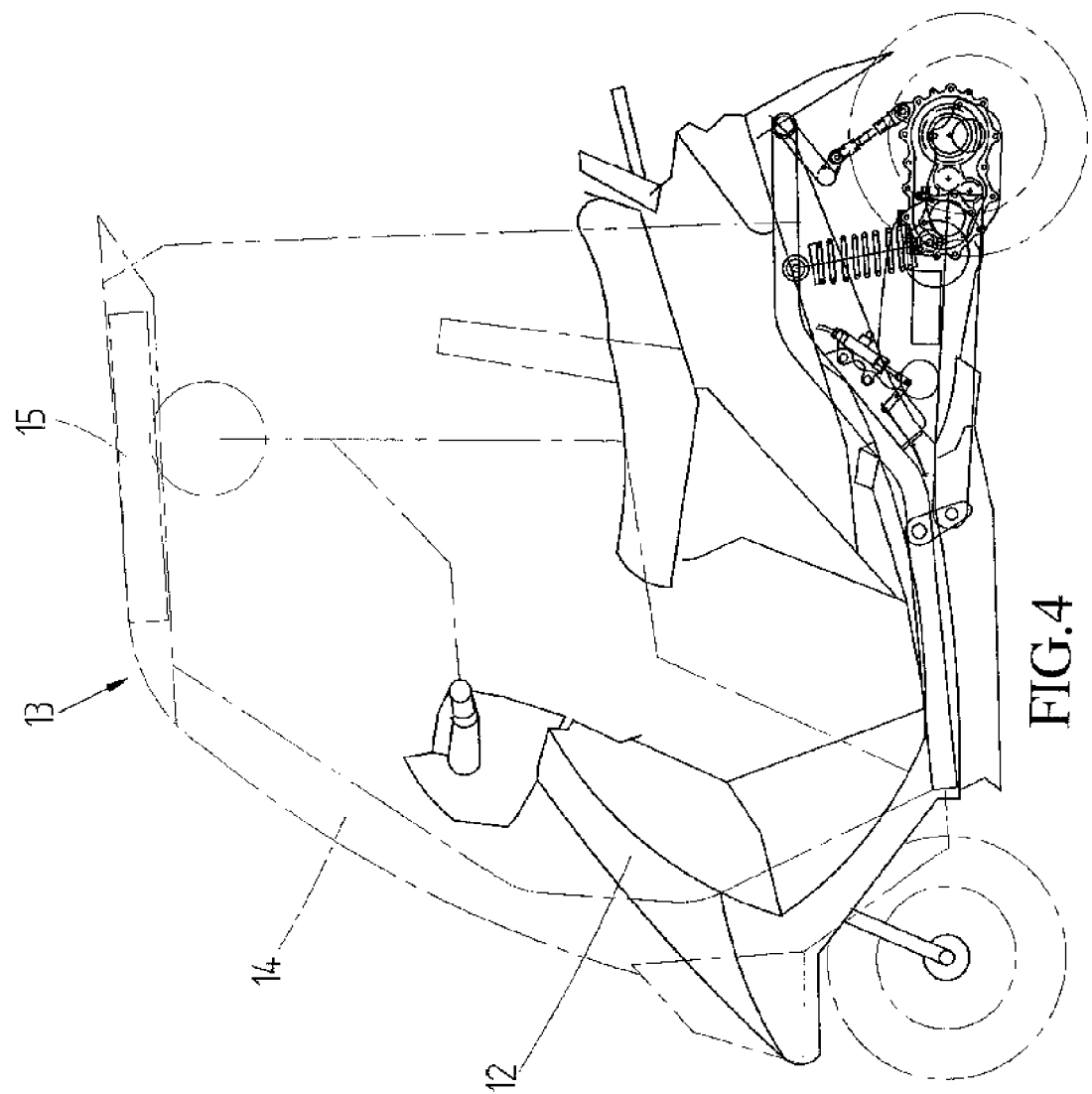
FIG. 4 shows a wind shield assembly is connected to the three-wheel vehicle.

FIG. 4 shows that the three-wheel vehicle of the present invention may be cooperated with an outer casing 12 and a wind shield assembly 13 is connected to the outer casing 12. The wind shield assembly 13 includes a wind shield 14 and a top 15. The wind shield 14 and the top 15 are made by transparent material.

The device uses most of the parts of the two-wheel motorbike so that the two-wheel motorbike can be kept and re-used. The three-wheel vehicle includes all the necessary parts such as the differential, the transmitting shafts and the cushion means and all the necessary parts are well positioned in the frame of the three-wheel vehicle.

While we have shown and described the embodiment in accordance with the present invention, it should be clear to those skilled in the art that further embodiments may be made without departing from the scope of the present invention.

What is claimed is:

1. A device for transferring two-wheel motorbike into three-wheel vehicle, comprising:

a rectangle frame having fixing plates on four corners thereof and the fixing plates adapted to be fixed on a frame of the two-wheel motorbike, each end of the rectangle frame having two threaded rods extending therefrom;

two side frames connected to two ends of the rectangle frame by extending the threaded rods through holes in lugs on the two side frames and connected with nuts, two wing rods connected to the two side frames respectively and each wing rod having an extension plate so that a bolt extends through the extension plate and a pivot of an arm is pivotably connected to each of the side rods, a cushion means connected between the side frame and the arm, a differential frame connected between the two side frames and having an adjustment member at a mediate portion of a tube thereof such that a top end of a hanging rod is connected to the two adjustment members, the hanging rod having a retractable means to adjust the length thereof and an end of the hanging rod pivotably connected to a lug of a differential, and the differential having an input end connected to an output shaft of an engine and an output end of the differential connected to two transmitting shafts which extend through bears on the arms and are connected to two rear wheels, the rear wheels each having a brake mechanism.

2. The device as claimed in claim 1, wherein a transverse bar is connected between each of the side frames and the wing rods.

3. The device as claimed in claim 1, wherein the retractable means of the hanging rod includes an adjustment nut which includes two threaded sections in opposite directions and two threaded rods are threadedly connected to the threaded sections of the adjustment nut so that when rotating the adjustment nut, the threaded rods are moved in opposite directions.

4. The device as claimed in claim 1, wherein the lugs of the side frames each have an elongate hole and a circular hole.

5. The device as claimed in claim 1, wherein the two transmitting shafts of the differential have different lengths.

6. The device as claimed in claim 1, wherein the tubes of the differential frame are adjusted and fixed to the side frames.

7. The device as claimed in claim 1, wherein the adjustment member tubes of the differential frame are pivoted and fixed to the tube of the differential frame.

8. The device as claimed in claim 1, wherein the brake mechanism on each of the rear wheels includes a brake disk and a brake pump fixed on the arm, a handlebar having a brake lever and a brake cable connected to the brake lever, the brake cable connected to a first end of a bar on a main pump frame and the other end of the bar pivotably connected to an action member on the main pump which is fixed on the main pump frame, the main pump having a hose which is connected to a valve which is connected to two sub-hoses which are connected to two respective brake pumps, when the brake lever is pulled to pull the brake cable, the bar is activated to drive the action member to send hydraulic oil to the brake pumps.

* * * * *